US008825114B2

(12) United States Patent
Kamii

(10) Patent No.: US 8,825,114 B2
(45) Date of Patent: Sep. 2, 2014

(54) MOBILE DISPLAY DEVICE

(75) Inventor: Toshihiro Kamii, Daito (JP)

(73) Assignee: KYOCERA Corporation, Kyoto (JP)

( * ) Notice: Subject to any disclaimer, the term of this patent is extended or adjusted under 35 U.S.C. 154(b) by 150 days.

(21) Appl. No.: 13/072,164

(22) Filed: Mar. 25, 2011

(65) Prior Publication Data

US 2011/0237306 A1     Sep. 29, 2011

(30) Foreign Application Priority Data

Mar. 25, 2010   (JP) ................................. 2010-070994
Feb. 21, 2011   (JP) ................................. 2011-034076

(51) Int. Cl.
    *H04B 1/38*       (2006.01)
    *H04M 1/725*     (2006.01)

(52) U.S. Cl.
    CPC ...... *H04M 1/72519* (2013.01); *H04M 2250/22* (2013.01); *H04M 2250/12* (2013.01); *H04M 1/72597* (2013.01)
    USPC .......................................... 455/567; 455/566

(58) Field of Classification Search
    USPC ....................... 455/567, 550.1, 566
    See application file for complete search history.

(56) References Cited

U.S. PATENT DOCUMENTS

2007/0075965 A1*   4/2007   Huppi et al. .................. 345/156
2008/0132283 A1*   6/2008   Ponce De Leon et al. ..... 455/566
2010/0130213 A1*   5/2010   Vendrow et al. .............. 455/445
2010/0167794 A1*   7/2010   Yin ................................ 455/567
2010/0285844 A1*   11/2010   Hosoi et al. ................... 455/566

FOREIGN PATENT DOCUMENTS

| JP | 2002-199443 A | 7/2002 |
| JP | 2002-208992 A | 7/2002 |
| JP | 2004-112448 A | 4/2004 |
| JP | 2007-180870 | 7/2007 |
| JP | 2009-224896 | 10/2009 |

OTHER PUBLICATIONS

Non-Final Office Action dated Jul. 1, 2014 issued by the Japanese Patent Office for Japanese Patent Application No. 2011-034076.

\* cited by examiner

*Primary Examiner* — Brandon Miller

(57) ABSTRACT

A mobile display device includes a display part, a speaker, a microphone, an incoming call-detecting part, a state-detecting part, and a display control part. The display part displays information. The speaker outputs voice. The microphone picks up voice. The incoming call-detecting part detects an incoming call. The state-detecting part detects a positional relationship of the speaker and the microphone. The display control part displays, on the display part, information suggesting the correction of the inclination of the apparatus itself, when the incoming call-detecting part detects an incoming call and the state-detecting part detects that the positional relationship of the speaker and the microphone is in a prescribed positional relationship.

20 Claims, 13 Drawing Sheets

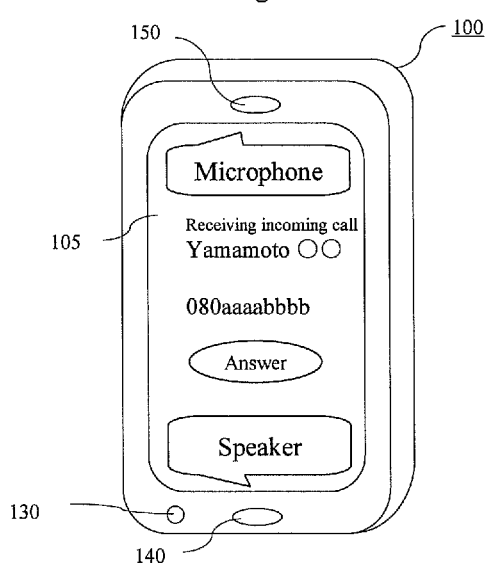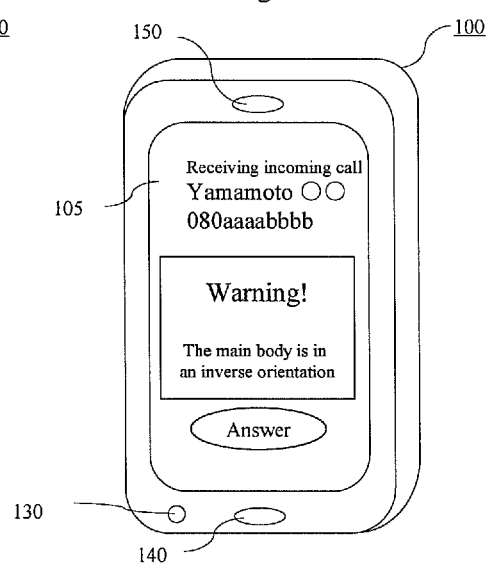

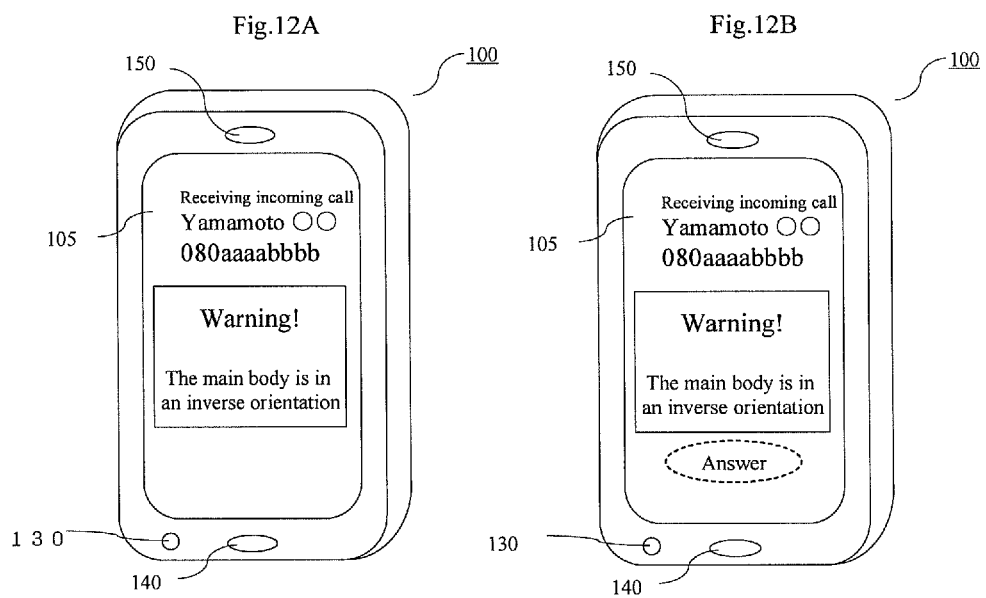

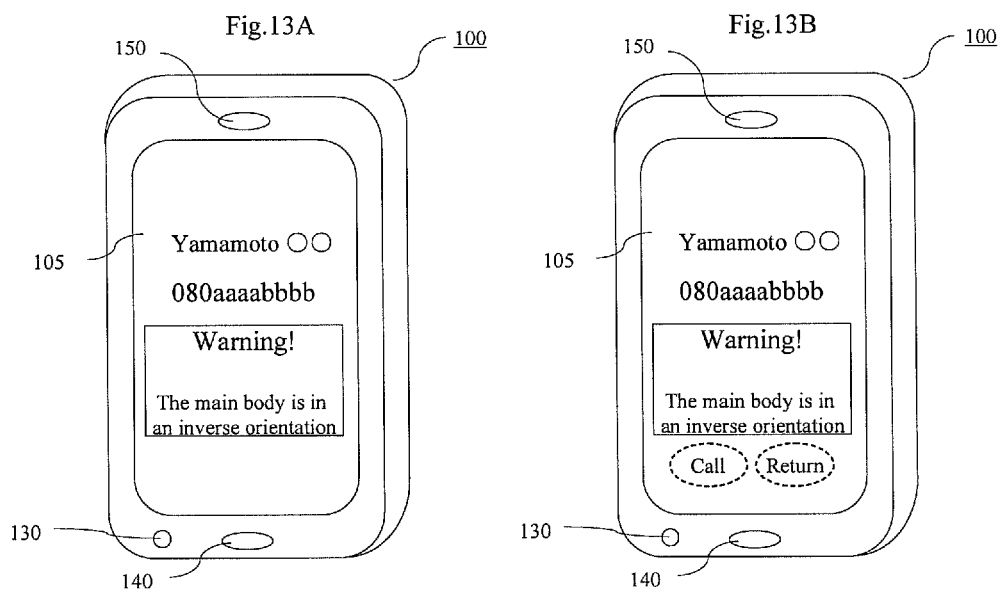

MOBILE DISPLAY DEVICE

CROSS-REFERENCE TO RELATED APPLICATION

The present application claims priority under 35 U.S.C. §119 to Japanese Patent Application No. 2010-070994, filed on Mar. 25, 2010, entitled "Mobile Terminal Apparatus" and Japanese Patent Application No. 2011-034076, filed on Feb. 21, 2011, entitled "Mobile Terminal Apparatus". The content of which is incorporated by reference herein in its entirety.

FIELD

The present invention is an invention related to a mobile terminal apparatus that includes devices.

BACKGROUND

It is not possible to change the arrangement of devices provided in a mobile terminal apparatus in accordance with the direction in which it is held.

Therefore, there is a risk that the devices may not be used in an appropriate position.

SUMMARY

In a first embodiment, a mobile display device comprises a display part, a speaker, a microphone, an incoming call-detecting part, a state-detecting part, and a display control part. The display part displays information. The speaker outputs voice. The microphone picks up voice. The incoming call-detecting part detects an incoming call. The state-detecting part detects a positional relationship of the speaker and the microphone. The display control part displays, on the display part, information suggesting the correction of the inclination of the apparatus itself, when the incoming call-detecting part detects an incoming call and the state-detecting part detects that the positional relationship of the speaker and the microphone is in a prescribed positional relationship.

In a second embodiment, a mobile display device comprises a display part, a speaker, a microphone, an operating part, a state-detecting part, and a display control part. The display part displays information. The speaker outputs voice. The microphone picks up voice. The operating part receives operations. The state-detecting part detects a positional relationship of the speaker and the microphone. The display control part displays, on the display part, information suggesting the correction of the inclination of the apparatus itself, when an operation related to an outgoing call is received at the operating part and the state-detecting part detects that the speaker and the microphone are in a prescribed positional relationship.

In a third embodiment, a mobile display device comprises a case, a device, an angle-detecting part, a notifying part, and a controlling part. The device is arranged at the case. The angle-detecting part detects an angle of the case with respect to the ground. The notifying part delivers a notice. The controlling part varies notices by the notifying part in accordance with the angle detected by the angle-detecting part while the device is being operated.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 3 B is a state in which the speaker of the mobile terminal apparatus is in a lower position than the microphone.

FIG. 9 A-B are describing an image to be displayed on the display part.

FIG. 12 A-B are diagrams describing an image to be displayed on the display part.

FIG. 13 A-B are diagrams describing an image to be displayed on the display part.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile phones, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

When a user engages in an operation related to a call, the mobile terminal apparatus related to the embodiments of the present invention detects the orientation of the mobile terminal apparatus and informs the user, if it is determined to be an incorrect orientation.

The embodiments of the present invention are described, referring to FIG. 1 through FIG. 13.

First, the configuration of the mobile terminal apparatus is described, referring to FIG. 1 through FIG. 7.

Figure 1:
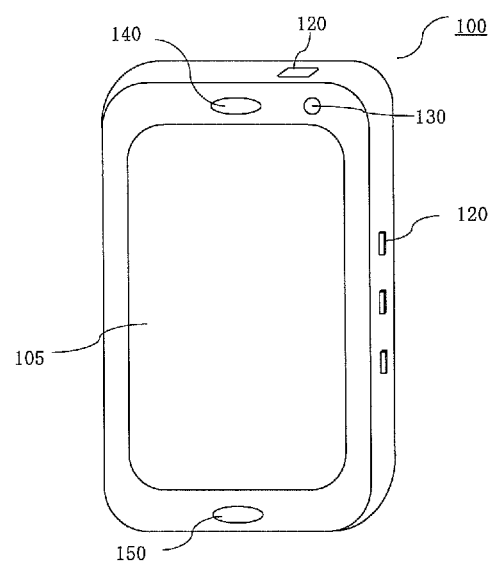
FIG. 1 is an oblique view of the appearance of a mobile terminal apparatus.

FIG. 1 is an oblique view of the appearance of a mobile terminal apparatus.

The case of the mobile terminal apparatus 100, as shown in FIG. 1, comprises a touch panel 105, an operating part 120, a light-emitting part 130, a speaker 140, a microphone 150, etc.

Figure 2:
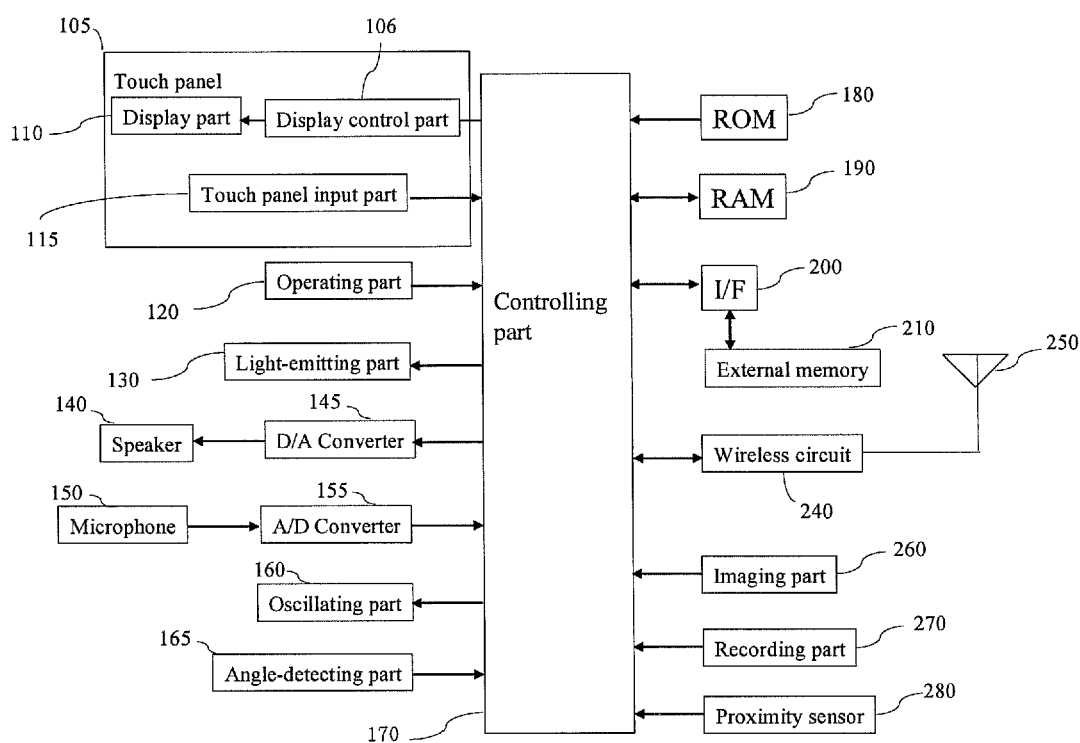
FIG. 2 is a block diagram of the mobile terminal apparatus.

FIG. 2 is a block diagram of the mobile terminal apparatus 100. The mobile terminal apparatus 100 shown in FIG. 2 comprises a touch panel 105, operating part 120, light-emitting part 130, speaker 140, D/A converter 145, microphone 150, A/D converter 155, oscillating part 160, angle-detecting part 165, controlling part 170, ROM 180 (Read Only Memory), RAM 190 (Random Access Memory), I/F (input/output interface) 200, external memory 210, wireless circuit 240, antenna 250, imaging part 260, recording part 270, and proximity sensor 280.

The touch panel 105 comprises a display control part 106, display part 110, and touch panel input part 115.

The display control part 106 causes the display part 110 to display image data stored in any one of ROM 180, RAM 190, or external memory 210, based on control signals output from the controlling part 170. Furthermore, the display control part 106 causes the display part 110 to display image data after inverting the same based on the operation of the user.

Figure 3:
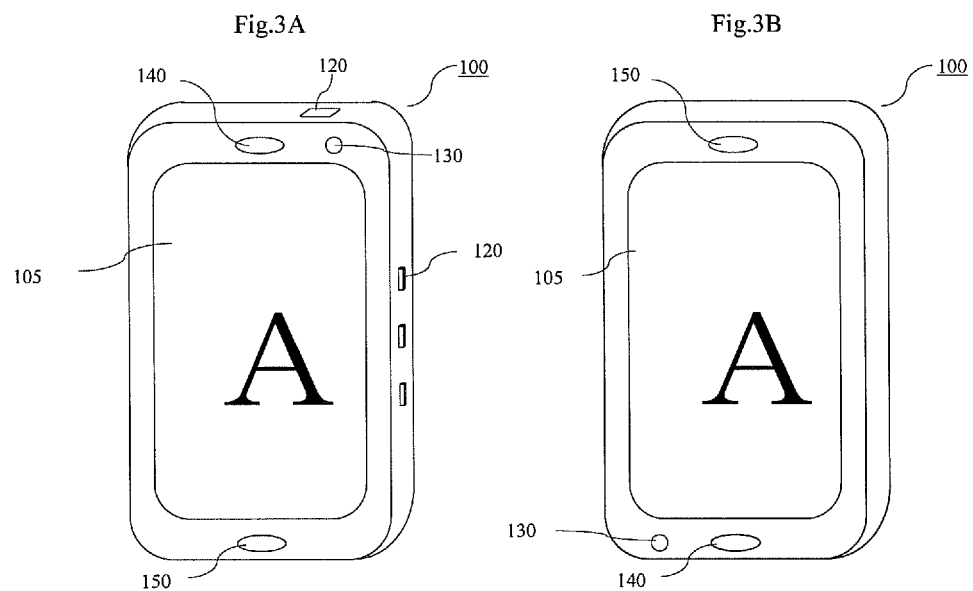
FIG. 3 A is a state in which the speaker of the mobile terminal apparatus is in a position higher than the microphone.

Herein, the control of inverting the orientation of the image data to be displayed on the display part 110 is described using FIG. 3. FIG. 3 A is a state in which the speaker 140 of the mobile terminal apparatus 100 is in a position higher than the microphone 150. In such a state, the display control part 106 causes the display part 110 to display the image data as in the orientation of FIG. 3A. FIG. 3 B is a state in which the speaker 140 of the mobile terminal apparatus 100 is in a lower position than the microphone 150. In such a state, the display control part 106 causes the display part 110 to display the image data after inverting the same. That is, as in FIG. 3 B, even if the user is operating the mobile terminal apparatus 100 in an incorrect orientation, because the image to be displayed in the display part has been inverted, the user may operate the mobile terminal apparatus 100 without correcting the orientation.

The display part 110 displays various kinds of information required for executing functions provided with the mobile terminal apparatus 100 based on the output from the display control part 106. The various kinds of information are, for example, function menus, emails, address book, incoming history or outgoing history of calls, sent history or received history of emails, and text data as well as image data, etc., stored in a data folder. The display part 110 is, for example, a liquid crystal display, organic EL (ELECTROLUMINESCENCE) display, plasma display, electronic paper, etc. The display part 110 in the present embodiment is a liquid crystal display.

The touch panel input part 115 is a pointing device that detects a position touched by a user using a finger or a pen etc., and outputs coordinates to the controlling part 170, according to the position. The touch panel input part 115 is arranged on the upper surface of the display part 110. The user touches the touch panel input part 115 using a means such as a finger or a pen; for example, pushing, stroking, drawing on the surface of the touch panel input part 115 using a finger or a pen, etc. That is, the touch panel input part 115 outputs, to the controlling part 170, the coordinates of the pushed position, the direction of the stroke, and the graphic drawn by the user. The touch panel input part 115 is, for example, a capacitance binding system which detects electric signals by static electricity, a resistance film system, an optical system, etc.

The operating part 120 receives operations from a user as inputs. The inputs received at the operating part 120 are output to the controlling part 170 as signals. The operating part 120 is arranged on the side surface of the mobile terminal apparatus 100 in the present embodiment.

The light-emitting part 130 emits light to the outside, in accordance with control signals output from the controlling part 170. The light-emitting part 130 is a light-emitting element, etc., for example, an LED. The light-emitting part 130 informs a user of incoming calls, outgoing calls, received emails, sent emails, replay of music data, advent of an alarm date/time, etc., by emitting light toward the outside.

The speaker 140 has the function of outputting sound toward the outside in accordance with control signals output from the controlling part 170. The speaker 140 is connected to the controlling part 170 via the D/A converter 145.

The D/A converter 145 converts digital signals output from the controlling part 170 to analog signals. The D/A converter 145 outputs the converted analog signals to the speaker 140.

The microphone 150 has a function to input sound from outside such as voice etc. The microphone 150 outputs the input sound to the A/D converter 155 as analog signals. The microphone 150 is connected to the controlling part 170 via the A/D converter 155. The A/D converter 155 converts analog voice signals input from the microphone 150 to digital signals so as to be output to the controlling part 170.

The oscillating part 160 generates mechanical oscillations by control signals output from the controlling part 170. The oscillating part 160 is, for example, a motor etc. The oscillating part 160 informs a user of incoming calls, received emails, advent of alarm date/time, etc., via mechanical oscillations.

The angle-detecting part 165 detects the angle of inclination of the mobile terminal apparatus 100 from a preliminarily prescribed normal state. The preliminarily prescribed normal state means, for example, a state in which the surface where the display part 110 is arranged becomes horizontal with respect to the ground. The angle-detecting part 165 outputs information regarding the detected angle to the controlling part 170. The angle-detecting part 165 is, for example, an angle sensor or an acceleration sensor, etc.

Figure 4:
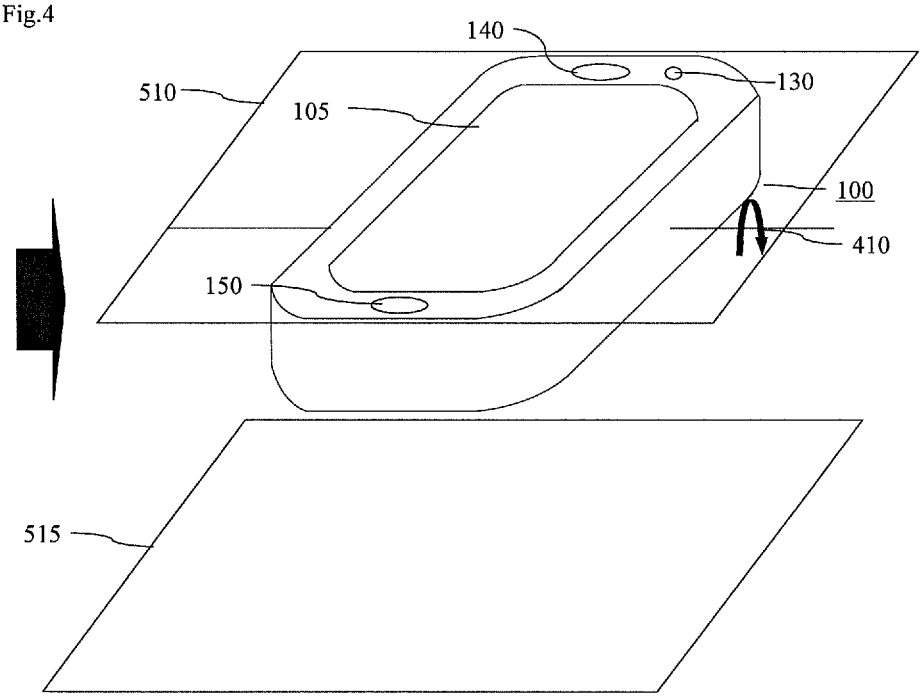
FIG. 4 is an oblique view of the appearance of a mobile terminal apparatus.
Figure 5A:
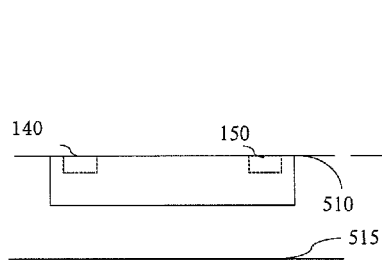
FIG. 5 A-E are side views of the mobile terminal apparatus.
Figure 5B:
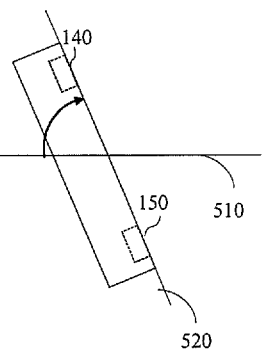
Figure 5C:
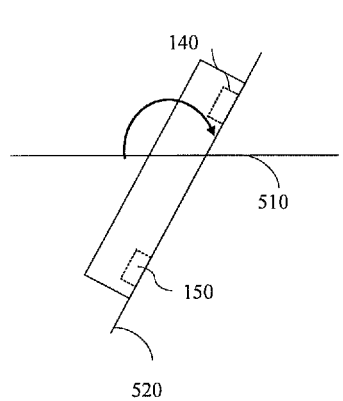
Figure 5D:
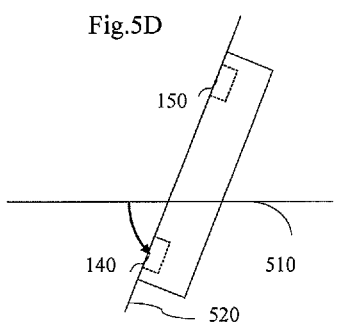
Figure 5E:
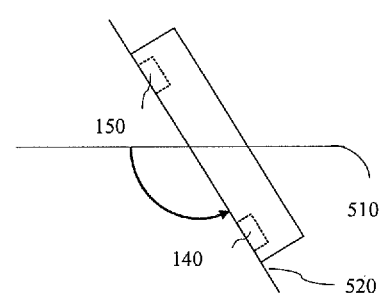

Next, the angle of inclination detected by the angle-detecting part 165 is described using FIG. 4 and FIG. 5. The rotary axis 410 shown in FIG. 4 is perpendicular to the longitudinal direction of the mobile terminal apparatus 100 and is a line passing through the center of the mobile terminal apparatus 100.

FIG. 5 is a simplified drawing of a side view of the mobile terminal apparatus 100 seen from the direction of the arrow shown in FIG. 4. FIG. 5 A shows a normal state of the mobile terminal apparatus 100 in the present embodiment. In the present embodiment, the normal state of the mobile terminal apparatus 100 is defined as a state in which the surface that comprises the display part 110 becomes horizontal with respect to the ground 515, as in FIG. 5A. That is, a surface that becomes horizontal to the ground and comprises the display part 110 is defined as a normal surface 510. The angle-detecting part 165 detects an angle of inclination when the mobile terminal apparatus 100 is inclined from the normal state when a center axis is a rotary axis 410.

FIG. 5B, FIG. 5C, FIG. 5D, and FIG. 5 E show examples in which the mobile terminal apparatus 100 is inclined. As shown in FIG. 5 B, FIG. 5 C, FIG. 5 D, and FIG. 5 E, a surface that is the same as the display part 110 at the time when the mobile terminal apparatus 100 is inclined is defined as an inclining surface 520. FIGS. 5 B and C are drawings showing a state in which the mobile terminal apparatus 100 is inclined so that the speaker 140 is in a position higher than the normal surface 510. In such a case, the angle-detecting part 165 detects an angle formed by the normal surface 510 and the inclining surface 520 as shown in FIGS. 5 B and C. FIG. 5 D and FIG. 5 E are drawings showing a state in which the mobile terminal apparatus 100 is inclined so that the speaker 140 is in a state lower than the normal surface 510. In such a case, the angle-detecting part 165 detects an angle formed by the normal surface 510 and the inclining surface 520 as shown in FIG. 5 D and FIG. 5 E.

The controlling part 170 controls software and hardware provided for the mobile terminal apparatus 100. For example, the controlling part 170 executes various kinds of functions provided for the mobile terminal apparatus 100 based on inputs received from the user at the operating part 120 or the touch panel input part 115. Furthermore, the controlling part 170 executes programs stored in the ROM 180, RAM 190, and external memory 210. Configurations provided for the controlling part 170 to execute the programs are described using FIG. 6.

Figure 6:
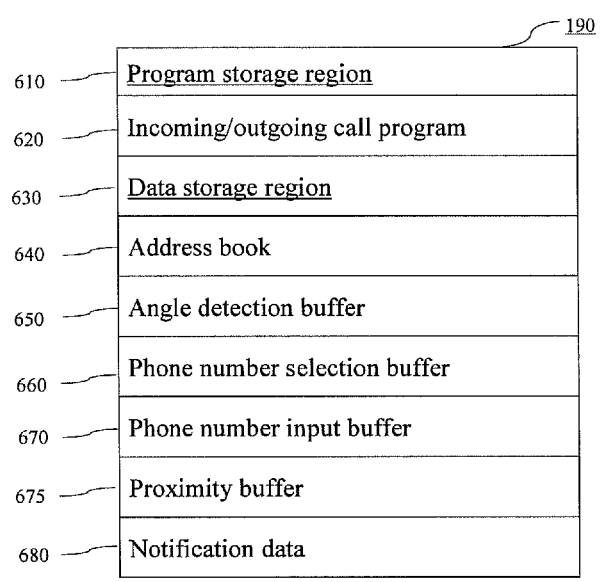
FIG. 6 is a diagram describing an arrangement of information stored in the RAM.

FIG. 6 shows an arrangement of information stored in the RAM 190 (hereinafter referred to as a memory map). The memory map comprises a program storage region 610 and data storage region 630.

The program storage region 610 comprises an incoming/outgoing call program 620 etc. The data storage region 630 comprises an address book 640, angle detection buffer 650, phone number selection buffer 660, phone number input buffer 670, and notification data 680 etc.

Programs stored in the program storage region 610 are described.

The incoming/outgoing call program 620 determines whether or not the mobile terminal apparatus 100 is held in a correct orientation by the user while a call is being made and, when it is determined that the mobile terminal apparatus 100 is being held in an incorrect orientation that may cause a problem for the mobile terminal apparatus 100 in making a call, the user is informed and the process starting the call is carried out when the orientation is corrected. The incoming/outgoing call program 620 is described in detail later, referring to FIG. 8 and FIG. 10.

An email text display program executes a process of displaying an email text on the display part 110 when an operation to display the email text is executed at the time of receiving an email.

Data stored in the data storage region 630 is described. The data storage region 630 comprises an address book 640, angle detection buffer 650, phone number selection buffer 660, phone number input buffer 670, and notification data 680.

The address book 640 stores information regarding addresses input by a user and required for outgoing calls, and for sending emails to other communication terminal devices. The information regarding addresses is information that comprises phone numbers and email addresses etc. Furthermore, for example, name, memory number, residential address, date of birth and group (for example, information related to affili-ations such as school or work) are linked to a phone number and an email address, and stored in the information regarding addresses.

The angle detection buffer 650 temporarily stores an angle of inclination that is detected by the angle-detecting part 165 from the normal state of the mobile terminal apparatus 100.

The phone number selection buffer 660 temporarily stores a phone number that is selected from the address book 640 via the operating part 120 or the touch panel input part 115 when an outgoing call is made by a user.

The phone number input buffer 670 is a buffer for temporarily storing a phone number that is input via the operating part 120 or the touch panel input part 115 by a user.

The proximity buffer 675 is a buffer for temporarily storing results detected by the proximity sensor 280.

The notification data 680 stores data to inform a user that the mobile terminal apparatus 100 is not being held in a correct orientation.

In addition to those cited above, the program storage region 610 and the data storage region 630 store programs and data required for executing various kinds of functions provided with the mobile terminal apparatus.

Return to the description of FIG. 2. The ROM 180 stores programs and data for executing functions provided with the mobile terminal apparatus 100.

The RAM 190 is accessible from the controlling part 170, and is used as a temporary storage region for the controlling part 170 to execute various kinds of processes.

The I/F 200 is equipped with an external memory 210 that is attachable/detachable. The controlling part 170 is capable of accessing the external memory 210 via the I/F 200 and, for example, reads out and executes programs as well as data etc. that have been stored in the external memory 210. The external memory 210 is a medium for storing programs or data and, for example, there are memory card, HDD (Hard Disk Drive), and SIM card (Subscriber Identity Module card) etc. Furthermore, the above programs and the data are not limited to programs that may directly be read out from the external memory 210 and executed, but may also be coded programs, compression-processed programs, image data, voice data, and text data etc.

The wireless circuit 240 converts a prescribed high frequency signal input from the antenna 250 to a digital voice signal via demodulation processing and decoding processing. Furthermore, the wireless circuit 240 converts digital voice signals input from the controlling part 170 to high frequency signals via encoding processing and modulation processing. Subsequently, the wireless circuit 240 outputs the high frequency signals to the antenna 250.

The antenna 250 receives magnetic waves of a prescribed frequency and outputs the same to the wireless circuit 240 as high frequency signals. Furthermore, the high frequency signals output from the wireless circuit 240 are output as magnetic waves of a prescribed frequency.

The imaging part 260 comprises camera functions as well as video functions. Images or video acquired by the imaging part 260 are stored in the ROM 180, RAM 190, and external memory 210. The imaging part 260 is, for example, a CCD (Charge Coupled Device) camera, or a CMOS (Complementary Metal Oxide Semiconductor) camera etc. The imaging part 260 is arranged in the rear surface of the case of the mobile terminal apparatus 100 shown in FIG. 1, and thus, is not illustrated in FIG. 1.

The recording part 270 comprises a function to record sound from outside such as sound input from the microphone 150. Furthermore, if a user does not respond to an incoming call from another terminal, the recording part 270 records sound from the other terminal input from the wireless circuit 240. Sound recorded by the recording part 270 is output via the speaker 140 by an input from the touch panel input part 115 and the operating part 120 by a user.

The proximity sensor 280 detects that a subject to be detected is in proximity to the mobile terminal apparatus 100. Furthermore, the proximity sensor 280 outputs the detected results to the controlling part 170 as an electric signal. Moreover, the results detected by the proximity sensor 280 are stored in the proximity buffer 675. For example, when a user talks and brings an ear close to the terminal, the proximity sensor 280 detects as in proximity. On the other hand, when a user moves the terminal away from an ear, the proximity sensor 280 detects as not in proximity. The proximity sensor 280 is, for example, an infrared sensor and an ultrasound sensor etc.

Figure 7:
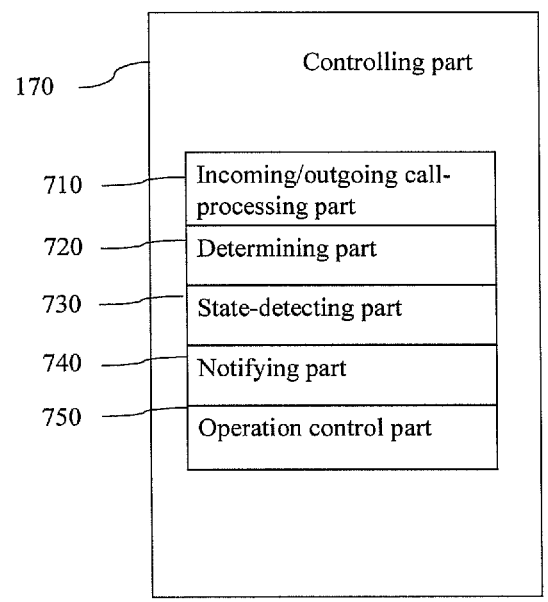
FIG. 7 is a diagram describing a configuration provided in the controlling part.

FIG. 7 is a drawing showing a configuration provided in the controlling part 170 for executing the programs stored in the RAM 190. The controlling part 170 comprises an incoming/outgoing call-processing part 710, determining part 720, state-detecting part 730, and notifying part 740.

The incoming/outgoing call-processing part 710 executes incoming/outgoing call program 620 stored in the RAM 190.

The determining part 720 determines what is to be executed by an input received from a user at the operating part 120 or at the touch panel input part 115. For example, the determining part 720 determines an input received at the operating part 120 or at the touch panel input part 115 from a user is whether or not an input to open the address book 640, whether or not an input to start talking, whether or not an input to start an incoming call. Furthermore, the determining part 720 determines whether or not the mobile terminal apparatus 100 is being held by a user. The determination is made based on whether or not the operating part 120 or the touch panel input part 115 has received an input from the user.

The state-detecting part 730 determines whether the orientation of the mobile terminal apparatus 100 is correct or not based on the angle of inclination detected by the angle-detecting part 165. The correct orientation means an orientation that does not cause a problem for a user to talk using the mobile terminal apparatus 100 while the speaker 140 is in a position higher than the microphone 150. The incorrect orientation means an orientation that causes a problem for a user to talk using the mobile terminal apparatus 100 while the speaker 140 is in a position lower than the microphone 150.

Next, a method of determining the orientation of the mobile terminal apparatus 100 conducted by the state-detecting part 730 is described. A state in which the microphone 150 is on the lower side from the normal surface 510 is defined as an inclining direction of +, and in a case of an angle detected by the angle-detecting part 165 is 1 degree to +180 degrees, the determining part 720 determines that the mobile terminal apparatus 100 is held in a correct orientation. And a state in which the microphone 150 is on the upper side from the normal surface 510 is defined as an inclining direction of −, and in a case of an angle detected by the angle-detecting part 165 is 0 degree to −179 degrees, the determining part 720 determines that the mobile terminal apparatus 100 is held in an incorrect orientation.

That is, in a state illustrated in FIG. 5 B and FIG. 5 C, because the state of the microphone 150 is in a position lower than the speaker 140, the determining part 720 determines that the mobile terminal apparatus 100 is held in an orientation that does not cause a problem for a user to talk.

On the other hand, in a state illustrated in FIG. 5 D and FIG. 5 E, because the state of the microphone 150 is in a position higher than the speaker 140, the determining part 720 determines that the mobile terminal apparatus 100 is held in an orientation that causes a problem for a user to talk.

The notifying part 740 notifies a user when the state-detecting part 730 determines that the orientation of the mobile terminal apparatus 100 is incorrect. As a notifying method, for example, the notification data 680 stored in the RAM 190 is displayed on the display part 110 via the display control part 106. Furthermore, when the state-detecting part 730 determines that the orientation of the mobile terminal apparatus 100 is incorrect, the notifying part 740 notifies the user that the orientation of the mobile terminal apparatus 100 is incorrect by controlling the speaker 140 as well as the light-emitting part 130 via the controlling part 170.

Figure 11:
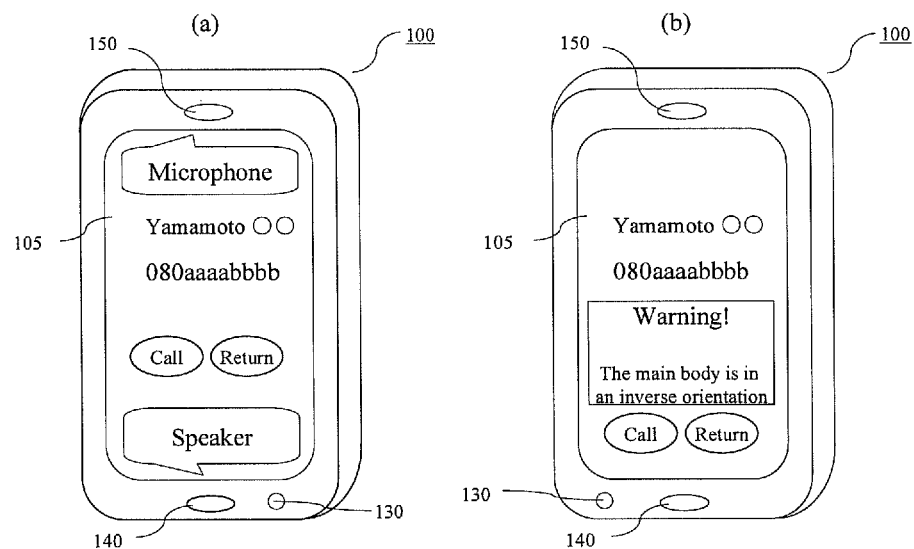
FIG. 11 A-B are diagrams describing an image to be displayed on the display part.

Here, one example of the notification data 680 to be displayed on the display part 110 is shown in FIG. 9 and FIG. 11. FIG. 9 is notification data 680 for a notification when the mobile terminal apparatus 100 had an incoming call. In the image shown in FIG. 9 A, a user is urged to hold the mobile terminal apparatus 100 in a correct orientation by being informed of the position of the microphone 150 and the speaker 140. In the image shown in FIG. 9 B, the user is urged to hold the mobile terminal apparatus 100 in a correct orientation by being informed of the position of the microphone 150 and the speaker 140, with a warning to the user that the mobile terminal apparatus 100 is being held in an inverse orientation. While such an image as in FIG. (9) is being displayed, if the user holds the mobile terminal apparatus 100 in a correct orientation, a phone call can be started either by selecting "answer", which is displayed on the screen or inputting to start a call on the operating part 120.

The image shown in FIG. 11 is an image to be displayed on the display part 110 when the user makes an outgoing call while the user is holding the mobile terminal apparatus 100 in an incorrect orientation. In the image shown in FIG. 11 A, the user is urged to hold the mobile terminal apparatus 100 in a correct orientation by being informed of the position of the microphone 150 and the speaker 140. In the image shown in FIG. 11 B, the user is urged to hold the mobile terminal apparatus 100 in a correct orientation by being notified that the mobile terminal apparatus 100 is being held in an inverse orientation.

While the notifying part 740 is in the middle of notifying, if there is an input from a user to respond to an incoming call or start an outgoing call at the operating part 120 or the touch panel input part 115, the operation control part 750 controls to cancel these inputs as invalid. The risk that the user will start talking while in an orientation that could cause a problem for the call may be reduced by controlling the inputs as invalid.

[Operation Process]

Figure 8:
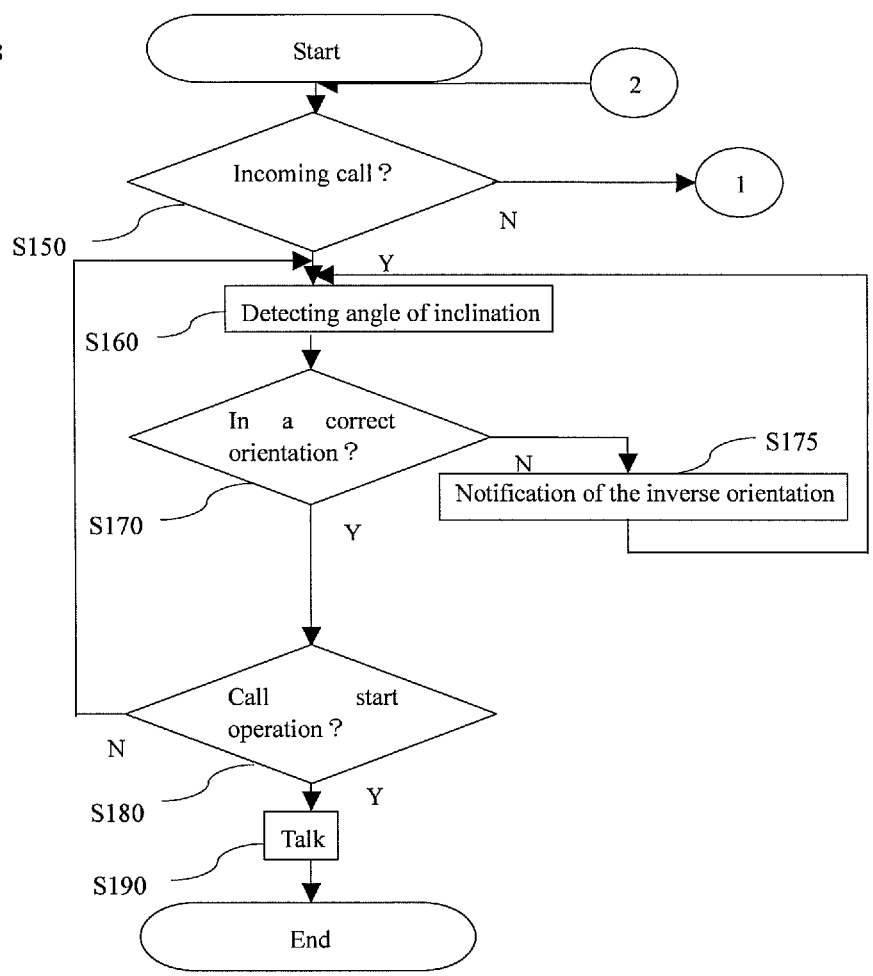
FIG. 8 is a flow chart diagram describing the incoming/outgoing call program.

Next, the incoming/outgoing call program 620 processed by the incoming/outgoing call-processing part 710 is described using FIG. 8.

In the incoming/outgoing call program 620, first, the determining part 720 determines whether there is an incoming call or not at the mobile terminal apparatus 100 (S150). If the determining part 720 determines that there is no incoming call at the mobile terminal apparatus 100, the incoming/outgoing call-processing part 710 moves to a process in the flow chart shown in FIG. 10.

On the other hand, when the controlling part 170 determines that there is an incoming call via the antenna 250, next, the angle-detecting part 165 detects the angle of inclination of the mobile terminal apparatus 100 (S160).

Next, the state-detecting part 730 determines whether or not the mobile terminal apparatus 100 is being held by the user in a correct orientation based on the angle detected by the angle-detecting part 165 (S170).

In S150, if the state-detecting part 730 determines that the mobile terminal apparatus 100 is being held in a correct orientation by the user, subsequently, the determining part 720 determines whether there was an input or not by the user to start a call at the operating part 120 or the touch panel input part 115 (S180).

If the determining part 720 determines that there was an input to start a call, next, a talking part starts a call by controlling the wireless circuit 240 (S190).

On the other hand, if the determining part 720 determines that there was no input to start a call, the incoming/outgoing call-processing part 710 again executes a process S160.

In the process S170, if the state-detecting part 730 determines that the mobile terminal apparatus 100 is being held by the user in an incorrect orientation, the incoming/outgoing call-processing part 710 executes the process S175.

In the process S175, the notifying part 740 displays an image as shown in FIG. 9 on the display part 110 via the display control part 106. Displaying such an image as shown in FIG. 9 notifies the user that the mobile terminal apparatus 100 is being held in an incorrect orientation and reduces the risk of starting to talk while the mobile terminal apparatus 100 is being held in an incorrect orientation.

After executing the process S175, the incoming/outgoing call-processing part 710 again executes the process S160.

Figure 10:
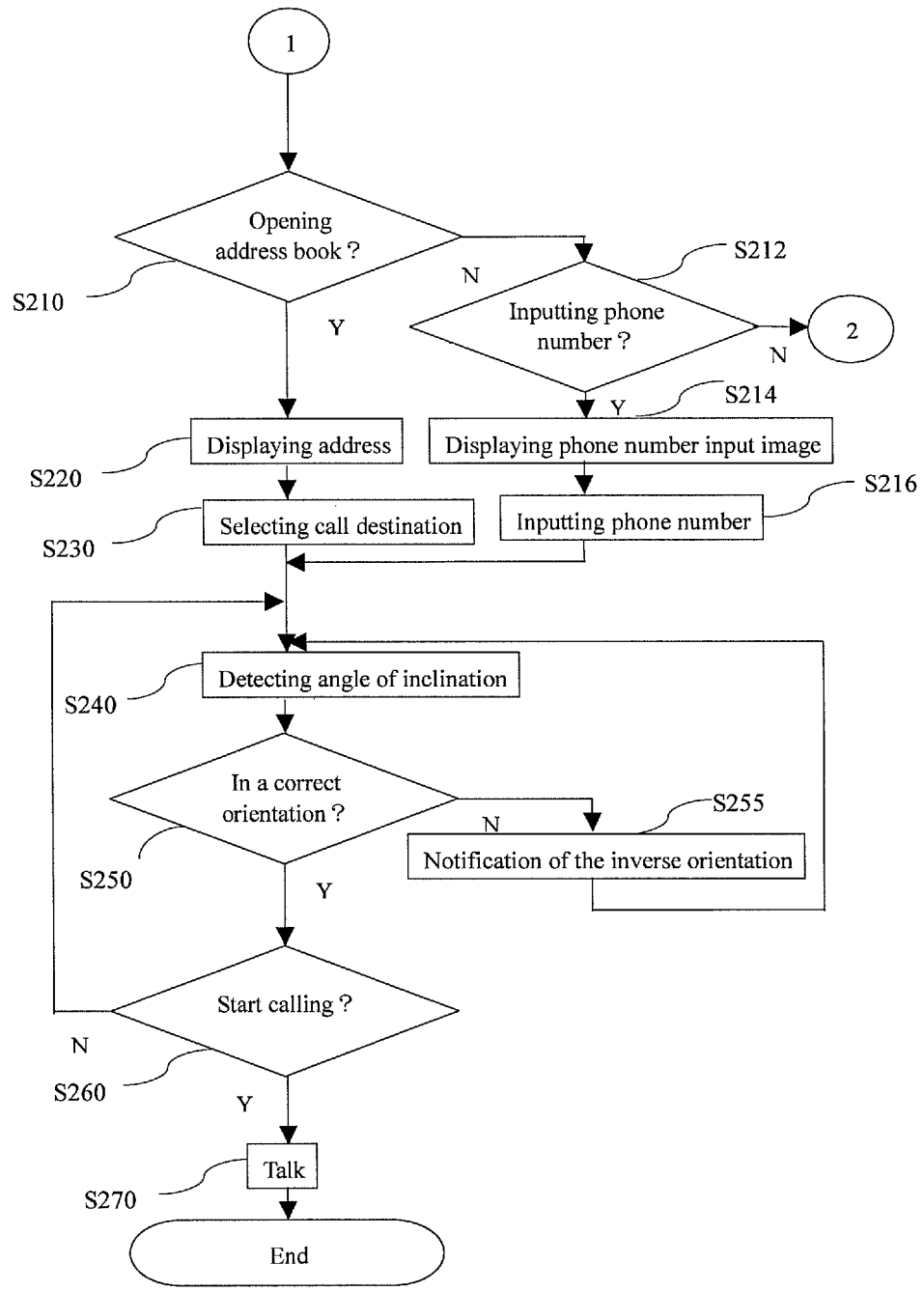
FIG. 10 is a flow chart diagram describing the incoming/outgoing call program.

Next, a process related to an outgoing call when determined by the controlling part 170 that there is no incoming call in the process S150 is described using FIG. 10.

In S150, when the controlling part 170 determines that there is no incoming call with respect to the mobile terminal apparatus 100 via the antenna 250, next, the determining part 720 determines whether there was an input or not by the user at the operating part 120 or at the touch panel input part 115 to open the address book 640 (S210).

If the determining part 720 determines that there was an input by the user to open the address book 640 using the operating part 120 or the touch panel input part 115, the display control part 106 causes the display part 110 to display information regarding address that has been stored in the address book 640 (S220).

Next, based on an input by the user using the operating part 120 or the touch panel input part 115 to select a phone number that is included in the information regarding address, the controlling part 170 temporarily stores the selected phone number in the phone number selection buffer 660 (S230).

On the other hand, if the determining part 720 determines that the input by the user to open the address book 640 using the operating part 120 or the touch panel input part 115 has not been received, subsequently, it is determined whether an input of a phone number was received or not (S212).

If the determining part 720 determines that there was an input of a phone number by the user, the display control part 106 displays a phone number display image on the display part 110 (S214).

Next, the controlling part 170 temporarily stores, in the phone number input buffer 670, the phone number that has been input by the user at the operating part 120 or the touch panel input part 115 (S216).

On the other hand, if the determining part 720 determines that there was no input of a phone number, the incoming/outgoing call-processing part 710 again executes the process S110 in FIG. 8.

After receiving the input to select a phone number by the user using the operating part 120 or the touch panel input part 115 in the process of either S230 or S216, next, the angle-detecting part 165 detects the angle of inclination of the mobile terminal apparatus 100 (S240).

Next, the state-detecting part 730 determines whether or not the mobile terminal apparatus 100 is being held by the user in a correct orientation based on the detected angle of inclination (S250).

If the state-detecting part 730 determines that the mobile terminal apparatus 100 is being held in a correct orientation by the user, next, the determining part 720 determines whether or not there was an input at the operating part 120 or the touch panel input part 115 by the user to start a call (S260).

If the determining part 720 determines that there was an input at the operating part 120 or the touch panel input part 115 to start a call by the user, the controlling part 170 controls the wireless circuit 240 and start the call (S270).

On the other hand, if the determining part 720 determines that the operation to start a call was not input by the user at the operating part 120 or the touch panel input part 115, the incoming/outgoing call-processing part 710 again executes the process S240.

In the process S250, if the state-detecting part 730 determines that the mobile terminal apparatus 100 is being held by the user in an incorrect orientation, the notifying part 740 displays an image as shown in FIG. 11 on the display part 110 via the display control part 106.

By displaying such an image shown in FIG. 11 on the display part 110, the user is notified that the mobile terminal apparatus 100 is being held in an incorrect orientation, thus, it reduces the risk of starting a call while the mobile terminal apparatus 100 is being held in an incorrect orientation.

The embodiment above is one example of the embodiments related to the mobile terminal apparatus 100 in the present invention and may be changed appropriately within the scope according to the aspect of the embodiment of the present invention.

For example, the timing for the notifying part 740 to notify may also be a time when a user enters an input at the operating part 120 or the touch panel input part 115 to open the address book 640. The other timing for the notification may also be a time when a numerical key pad is displayed on the display part 110 that the mobile terminal apparatus 100 comprises and when the user starts entering a phone number at the operating part 120 or the touch panel input part 115. The other timing for the notification may also be a time when the user completes the input of the phone number at the operating part 120 or the touch panel input part 115.

For example, the method of notification conducted by the notifying part 740 may also be conducted by the display control part 106 as a result of inverting an image to be displayed on the display part 110.

For example, the notifying part 740 notifies the user that the orientation of the mobile terminal apparatus 100 is incorrect by controlling the speaker 140 as well as the light-emitting part 130 via the controlling part 170, but the notification may also be conducted by the controlling part 170 by controlling the speaker 140 and the light-emitting part 130 without intervention by the notifying part 740.

For example, the notification method conducted by the notifying part 740 may also be conducted by the display control part 106, by not displaying a button on the display part 110 to start a call. Specifically, it is also possible to not display the "answer" on the display part 110 in the images shown in FIGS. 9 A and B. Furthermore, it is also possible not to display a "call" button on the display part 110 in the images shown in FIGS. 11 A and B. As described above, the risk of the user being in a situation where a call becomes difficult is reduced by not displaying the "answer" for a response to an incoming call and the "call" to start an outgoing call.

For example, the operating part may also be provided on the same plane as the display part 110 that is provided with the mobile terminal apparatus 100.

For example, as for the incoming/outgoing call program 620, if there is an input by a user to interrupt the incoming/outgoing call program 620 either at the operating part 120 or the touch panel input part 115, the incoming/outgoing call program 620 may be interrupted even in a case when any of processes is being executed.

For example, in the present embodiment, while the notifying part 740 is notifying, if the operating part 120 or the touch panel input part 115 receives an input from the user to respond to an incoming call or receives an input to start an outgoing call, the operation control part 750 controls to cancel these inputs as invalid. However, as another example, it is also possible to start a call, regarding an input from the user to start a call as valid without controlling, by the operation control part 750, the input operation from the user as invalid.

For example, if a user is holding the mobile terminal apparatus 100 in an inverse orientation, images or video acquired by the imaging part 260 are stored in the ROM 180, RAM 190, or the external memory 210 after inverting the orientation. In such a case, in the event of displaying the stored images and the video on the display part 110, the notifying part 740 may also notify that the orientation has been inverted for the display.

For example, if the user is holding the mobile terminal apparatus 100 in an inverse orientation, operations related to functions that could cause a problem for the use are cancelled as invalid by the operation control part 750. Specifically, if the user is holding the mobile terminal apparatus 100 in an inverse orientation, operations related to the imaging part 260 are cancelled as invalid by the operation control part 750. And the notifying part 740 may also display such an image as shown in FIG. 9 B on the display part 110. In the above embodiment, if the user corrects the way of holding the mobile terminal apparatus 100 in a correct orientation, it is also possible to regard input operations from the user with respect to the imaging part 260 as valid.

For example, the present invention may also be implemented when an input is received from the user using the operating part 120 or the touch panel input part 115 to replay sound recorded in the recording part 260, or when an input is received to start recording sound in the recording part 260. That is, if the mobile terminal apparatus 100 detects the orientation in a case of replaying the recorded sound by an operation from the user and in a case of recording sound by the user, and if it is determined that the mobile terminal apparatus 100 is being held by the user in an incorrect orientation, a notification may also be provided. Such a process executed by the mobile terminal apparatus 100 reduces the risk of generating a problem in the event when the recording function is used by the user.

For example, while a user is holding the mobile terminal apparatus 100 in an incorrect orientation and if an incoming call is received at the mobile terminal apparatus 100, it is also possible not to display a button for responding to the incoming call on the display part 110 as shown in FIG. 12 A. Furthermore, as shown in the dotted line in FIG. 12 B, a button related to a response to be displayed on the display part 110 may also be displayed with a lower luminance. Such a display on the display part 110 by the mobile terminal apparatus 100 reduces the risk of creating a state in which a phone call becomes difficult when a user responds to the incoming call.

Furthermore, also when a user makes an outgoing call, screens as shown in FIGS. 13A and 13B may be displayed on the display part 110 by the mobile terminal apparatus 100.

Such a display on the display part 110 by the mobile terminal apparatus 100 reduces the risk of creating a state in which a phone call becomes difficult when a user talks.

For example, when the proximity sensor 280 detects a subject to be detected is in proximity during a call, the mobile terminal apparatus 100 switches off the display of the display part 110. Furthermore, the mobile terminal apparatus 100 may also switch off a back-light arranged at a liquid crystal display constituting the display part 110. That is, while a user is using the mobile terminal apparatus 100 against an ear, it is also possible for the mobile terminal apparatus 100 to not display an image on the display part 110 for the purpose of saving power.

Moreover, after the proximity is detected by the proximity sensor 280 during a call, when the proximity is no longer detected, such processes in S160 to 5175 shown in FIG. 8 or S240 to S255 shown in FIG. 10 may also be executed again. That is, while a user is on the phone with an ear against the mobile terminal apparatus 100, after placing the mobile terminal apparatus 100 on the desk etc. when the same is held in a hand again, the mobile terminal apparatus 100 detects the orientation of being held. And if the mobile terminal apparatus 100 is being held in an incorrect orientation and such is detected, the matter of the incorrect orientation may also be notified to the user. Such a process executed by the mobile terminal apparatus 100 reduces the risk of the user causing a problem in talking.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard" "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and everyone of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile terminal comprising:
  a display;
  a speaker positioned above a microphone in a prescribed orientation;
  a wireless part operable to receive an incoming call; and
  a controller operable to display, on the display, an image informing a user of a position of at least one of the speaker and the microphone when the incoming call is received and the speaker and the microphone are not in the prescribed orientation.

2. The mobile terminal according to claim 1, wherein the controller further displays, on the display, a warning text box indicating that the mobile terminal is in an orientation other than the prescribed orientation when the incoming call is received.

3. The mobile terminal according to claim 1, wherein the image points to the at least one of the speaker and the microphone.

4. The mobile terminal according to claim 3, wherein the image is positioned in the display adjacent to the at least one of the speaker and the microphone.

5. The mobile terminal according to claim 3, wherein the image comprises a first image positioned in the display adjacent the speaker that points to the speaker, and a second image positioned in the display adjacent the microphone that points to the microphone.

6. The mobile terminal according to claim 1, wherein the image comprises an answer-call button when the incoming call is received, the answer-call button having a first appearance when the speaker and the microphone are in the prescribed orientation, and having a second appearance when the speaker and the microphone are not in the prescribed orientation.

7. The mobile terminal according to claim 1, wherein the controller is operable to invalidate a user operation to start an outgoing call when the speaker and the microphone are not in the prescribed orientation.

8. The mobile terminal according to claim 1, further comprising an angle detecting part coupled to the controller, the controller utilizing information from the angle detecting part to determine the prescribed orientation.

9. A mobile terminal comprising:
  a display;
  a speaker and a microphone in a prescribed orientation on opposite sides of the display;
  an wireless circuit operable to detect an incoming call; and
  a controller operable to invalidate a user operation to respond to the incoming call when the speaker and the microphone are not in the prescribed orientation, and to validate the user operation to respond to the incoming call when the speaker and the microphone are in the prescribed orientation.

10. The mobile terminal of claim 9, wherein the wireless circuit is operable to place an outgoing call;
  wherein the controller is further operable to invalidate a user operation to place the outgoing call when the speaker and the microphone are not in the prescribed orientation, and to validate the user operation to place the outgoing call when the speaker and the microphone are in the prescribed orientation.

11. The mobile terminal of claim 9, wherein the controller is operable to display, on the display, an image informing a user of a position of at least one of the speaker and the microphone when the incoming call is detected and the speaker and the microphone are not in the prescribed orientation.

12. The mobile terminal according to claim 9, wherein the controller displays, on the display, a warning text box indicating that the mobile terminal is in an orientation other than the prescribed orientation when the incoming call is detected.

13. The mobile terminal according to claim 11, wherein the image is positioned in the display adjacent to the at least one of the speaker and the microphone and is configured to point to the at least one of the speaker and the microphone.

14. The mobile terminal according to claim 11, wherein the image comprises a first image positioned in the display adjacent the speaker that points to the speaker, and a second image positioned in the display adjacent the microphone that points to the microphone.

15. The mobile terminal according to claim 9, wherein the user operation comprises pressing an answer-call button on the display, wherein the answer-call button has a first appearance when the speaker and the microphone are in the prescribed orientation, and the answer-call button has a second appearance when the speaker and the microphone are not in the prescribed orientation.

16. A mobile terminal apparatus comprising:
  a display operable to display at least one of a first button and a second button to accept a user operation to take an incoming call or to make an outgoing call, the first button having a different appearance from the second button;
  a speaker;
  a microphone;
  a wireless part operable to receive the incoming call and to transmit the outgoing call;
  a control part operable, when the incoming call is received,
    to display the first button on the display when the microphone is in a position lower than the speaker; and
    to not display the first button or to display the second button when the microphone is in a position higher than the speaker.

17. The mobile terminal apparatus according to claim 16, wherein
  the second button is same in shape as the first button and is different in luminance from the first button.

18. The mobile terminal apparatus according to claim 16, wherein
  the second button is same in shape as the first button and comprises a dashed line while the first button comprises a solid line corresponding to the dashed line of the second button.

19. The mobile terminal apparatus according to claim 16, wherein the display is further operable to display numeric buttons for selecting phone numbers or to display a phone number list to make the outgoing call, and the control part is further operable, when the numeric buttons or the list is displayed, to display the first button on the display when the microphone is in a position lower than the speaker; and to not display the first button or to display the second button when the microphone is in a position higher than the speaker.

20. The mobile terminal apparatus cording to claim 16, wherein the control part is further operable to display, on the display, an image informing a user of a position of at least one of the speaker and the microphone when the microphone is in a position higher than the speaker.

\* \* \* \* \*